United States Patent
Li et al.

(10) Patent No.: US 11,749,024 B2
(45) Date of Patent: Sep. 5, 2023

(54) GRAPHICS PROCESSING METHOD AND RELATED EYE-TRACKING SYSTEM

(71) Applicant: Ganzin Technology, Inc., Taipei (TW)

(72) Inventors: Kuei-An Li, New Taipei (TW); Shao-Yi Chien, Taipei (TW)

(73) Assignee: Ganzin Technology, Inc., Taipei (TW)

( * ) Notice: Subject to any disclaimer, the term of this patent is extended or adjusted under 35 U.S.C. 154(b) by 424 days.

(21) Appl. No.: 17/106,202

(22) Filed: Nov. 30, 2020

(65) Prior Publication Data

US 2022/0171968 A1 Jun. 2, 2022

(51) Int. Cl.
*G06K 9/00* (2022.01)
*G06V 40/19* (2022.01)
*G06T 7/246* (2017.01)
*G06T 11/60* (2006.01)
*G06T 1/20* (2006.01)
*G06T 3/40* (2006.01)

(52) U.S. Cl.
CPC ............... *G06V 40/19* (2022.01); *G06T 1/20* (2013.01); *G06T 3/40* (2013.01); *G06T 7/248* (2017.01); *G06T 11/60* (2013.01); *G06T 2207/20016* (2013.01); *G06T 2207/30041* (2013.01)

(58) Field of Classification Search
CPC ......... H04N 5/335; H04L 51/38; G06T 11/00; G06T 19/006; G06Q 30/0202; G06F 16/26; G06F 3/016; G06F 11/3409
See application file for complete search history.

(56) References Cited

U.S. PATENT DOCUMENTS

| | | | |
|---|---|---|---|
| 10,720,128 B2 | 7/2020 | Young | |
| 10,896,657 B2* | 1/2021 | Feng | G09G 5/001 |
| 11,363,282 B1* | 6/2022 | Christofferson | H04N 19/13 |

FOREIGN PATENT DOCUMENTS

| | | |
|---|---|---|
| CN | 109271022 A | 1/2019 |
| CN | 110488977 A | 11/2019 |

* cited by examiner

*Primary Examiner* — Phuoc H Doan
(74) *Attorney, Agent, or Firm* — Winston Hsu (57) ABSTRACT

The present invention provides a graphics processing method and an eye-tracking system capable of providing adaptive foveated rendering. If the system latency of a current application is greater than the threshold latency under the existing rendering parameter, adjusted rendering parameters are provided by adjusting the existing rendering parameters according to the system latency of the current application. Foveated images may thus be generated according to the adjusted rendering parameters in order to maintain the balance of resolution quality and rendering performance.

11 Claims, 6 Drawing Sheets

GRAPHICS PROCESSING METHOD AND RELATED EYE-TRACKING SYSTEM

BACKGROUND OF THE INVENTION

1. Field of the Invention

The present invention is related to a graphics processing method and an eye-tracking system, more particularly, to a graphics processing method and an eye-tracking system capable of providing adaptive foveated rendering.

2. Description of the Prior Art

Rendering is a computationally expensive process in which the entire scene's spatial, textural, and lighting information are combined to determine the color value of each pixel in the rendered image. Computing devices often utilize a graphics processing unit (GPU) to accelerate the rendering of graphical data for display. Such computing devices may include, for example, computer workstations, smartphones, embedded systems, personal computers, tablet computers, video game consoles and head mounted display (HMD) devices. A GPU is configured to execute a graphics processing pipeline that includes multiple processing stages that operate together to execute graphics processing commands/instructions and output a frame. A central processing unit (CPU) may control the operation of the GPU by issuing one or more graphics processing commands/instructions to the GPU. Modern day CPUs are typically capable of concurrently executing multiple applications, each of which may need to utilize the GPU during execution. Graphics processing devices performing the rendering, however, have limited processing power and memory capacity. These limits make the rendering of the scene, especially real-time rendering, a challenging task.

To speed up the rendering process, foveated rendering may be employed. Foveated rendering uses an eye tracker to reduce the rendering workload based on the observation that human vision typically focuses on the portion of the screen near the gaze point whereas the visual acuity drops dramatically in the peripheral vision (i.e. the area outside of the zone gazed by the fovea). In foveated rendering, the content in an area near the gaze point of a user is rendered with high quality, whereas the content outside the foveated region is rendered with lower quality. As the user's gaze point moves, the images are re-rendered accordingly to match the new location of the gaze point.

However, the high-quality area of the rendered image displayed to a user does not always match the foveated region of the user. Reasons for this mismatch include the system latency introduced by the rendering process, and the latency and inaccuracy in the gaze point estimation, especially in scenarios where saccade or blinking has occurred. As a result, the image rendered and displayed to a user might be generated based on a gaze point estimated for the user tens of milliseconds ago. Consequently, the content that is projected to the user's foveated region at the time of display may be rendered in low quality, thereby causing unpleasant viewing experience. Therefore, there is a need for a graphics processing method and related eye-tracking system capable of providing adaptive foveated rendering.

SUMMARY OF THE INVENTION

The present invention provides a graphics processing method which includes acquiring eye-tracking data of a user; acquiring a rendering requirement of a current application which includes an existing rendering parameter associated with the current application; evaluating a first system latency of the current application on a real-time basis according to the eye-tracking data and the rendering data; determining whether the first system latency is greater than a second system latency which is an threshold latency under the existing rendering parameter; adjusting the existing rendering parameter according to the first system latency when determining that the first system latency is greater than the second system latency; and generating a foveated image according to the adjusted rendering parameter during the current application.

The present invention also provides a computer-readable medium having computer-readable instructions embodied therein. The computer-readable instructions are configured to implement a graphics processing method when executed, the graphics processing method including acquiring eye-tracking data of a user; acquiring a rendering requirement of a current application which includes an existing rendering parameter associated with the current application; evaluating a first system latency of the current application on a real-time basis according to the eye-tracking data and the rendering requirement; determining whether the first system latency is greater than a second system latency which is an threshold latency under the existing rendering parameter; adjusting the existing rendering parameter according to the first system latency when determining that the first system latency is greater than the second system latency; and generating a foveated image according to the adjusted rendering parameter during the current application The present invention also provides an eye-tracking system which provides an adaptive foveated rendering. The eye-tracking system includes an eye tracking module, a computing module and a display. The eye tracking module includes an image-capturing device configured to capture eye images of a user. The computing module includes a GPU, a control unit, and a CPU. The CPU is configured to acquire a rendering requirement of a current application which includes an existing rendering parameter associated with the current application; evaluate a first system latency of the current application on a real-time basis according to eye-tracking data and the rendering requirement; determine whether the first system latency is greater than a second system latency which is an threshold latency under the existing rendering parameter; instruct the control unit to adjust the existing rendering parameter according to the first system latency when determining that the first system latency is greater than the second system latency; and instruct the GPU to generate a foveated image according to the adjusted rendering parameter during the current application. The display is configured to display the foveated image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
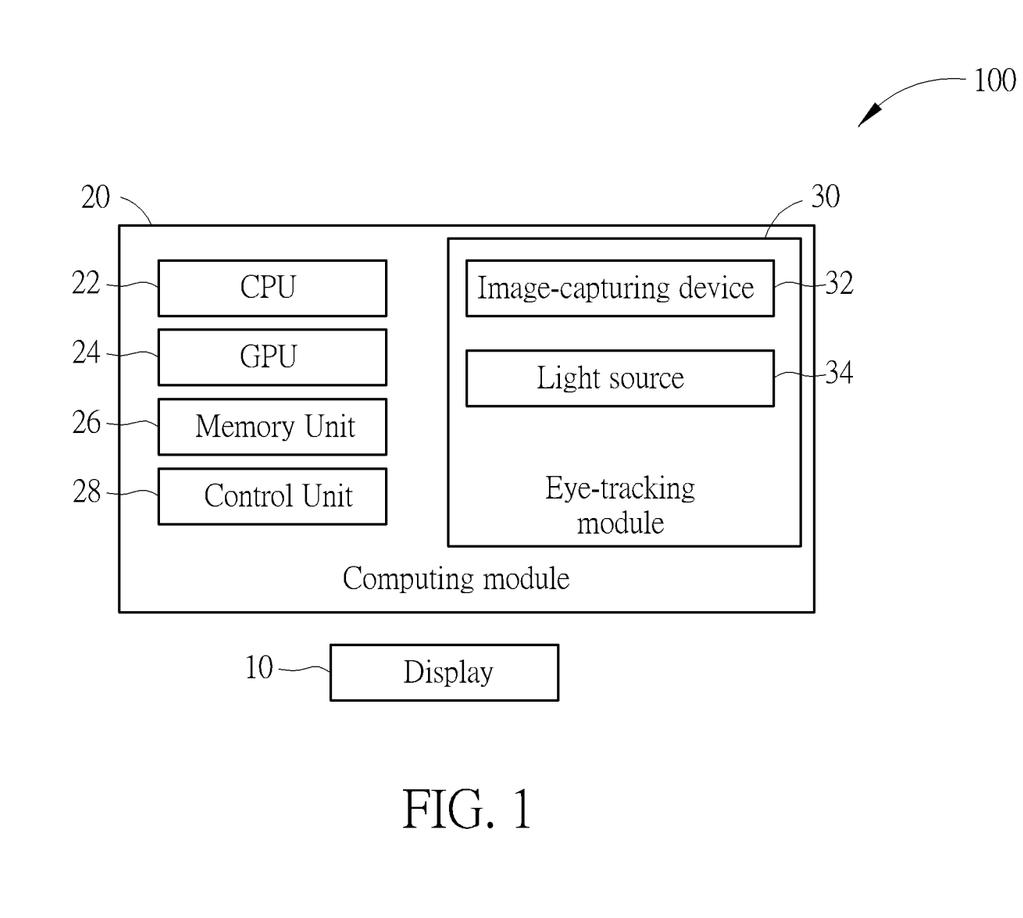
FIG. 1 is a functional diagram illustrating an eye-tracking system according to an embodiment of the present invention.

FIG. 1 is a functional diagram illustrating an eye-tracking system 100 according to an embodiment of the present invention. The eye-tracking system 100 includes a display 10 and a computing module 20. The computing module 20 includes a CPU 22, a GPU 24, a memory unit 26, a control unit 28, and an eye tracking module 30. The eye tracking module 30 includes an image-capturing device 32 and a light source 34.

Figure 2:
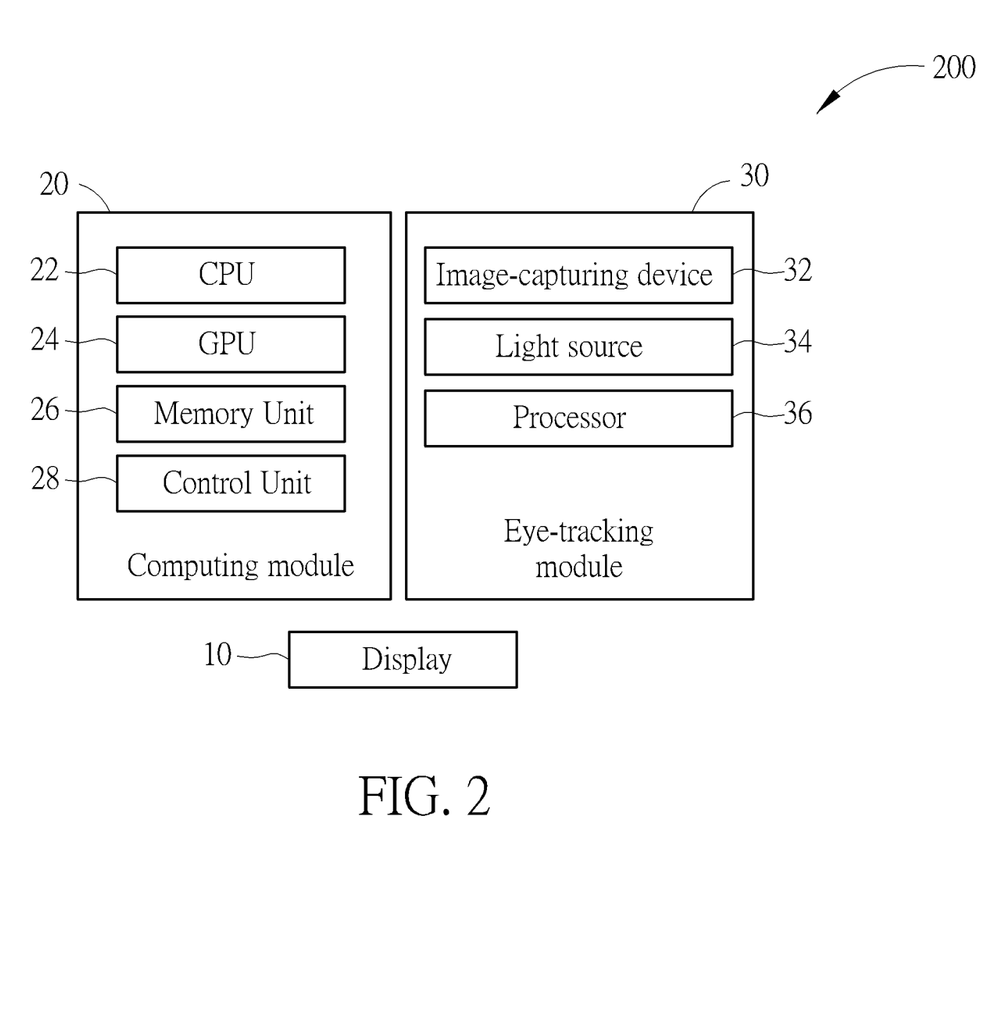
FIG. 2 is a functional diagram illustrating an eye-tracking system according to another embodiment of the present invention.

FIG. 2 is a functional diagram illustrating an eye-tracking system 200 according to another embodiment of the present invention. The eye-tracking system 200 includes a display 10, a computing module 20 and an eye tracking module 30. The computing module 20 includes a CPU 22, a GPU 24, a memory unit 26, and a control unit 28. The eye tracking module 30 includes an image-capturing device 32, a light source 34, and a processor 36.

In the eye tracking module 30 of the eye-tracking system 100 or 200, the image-capturing device 32 may include at least one eye camera disposed at a location and in an orientation capable of capturing eye images of a user. In another embodiment, the image-capturing device 32 may further include a scene camera (not shown in FIGS. 1 and 2) which is disposed in a way to face the same direction as the gaze direction of the user and configured to record the image associated with the field of view (FoV) of the user. The light source 34 is configured to illuminate user eyes for improving the quality of the eye images and thus the accuracy of the gaze data.

In the eye-tracking systems 100 and 200, the computing module 20 may be a personal computer, a mobile device or a head-mounted device (such as AR/VR/MR/smart glasses) capable of handling application requests from the user and performing image rendering. However, the type of the computing module 20 does not limit the scope of the present invention.

In the embodiment depicted in FIGS. 1 and 2, the display 10 may be an external display device with a wired or wireless connection to the computing module 20. In another embodiment, the display 10 may be a display device integral to the computing module 20. However, the implementation of the display 10 does not limit the scope of the present invention.

In the eye-tracking system 100 depicted in FIG. 1, the eye tracking module 30 is integrated into the computing module 20. The memory unit 26 may store gaze-tracking programs, foveation adjustment programs, and foveation rendering programs. The CPU 22 may perform eye-tracking according to the eye images received from the image-capturing device 32. For example, the CPU 22 may execute one or more gaze-tracking programs stored in the memory unit 26 for acquiring gaze data and eye movement status data based on the eye images. The control unit 28 is configured to coordinate the operation of each device in the computing module 20 in response to the application request from the user, as well as adjust rendering parameters. The control unit 28 may be implemented as an application-specific integrated circuit (ASIC) with computational ability, software installed in the GPU 24, or hardware disposed in the GPU 24 However, the implementation of the control unit 28 does not limit the scope of the present invention.

In the eye-tracking system 200, the computing module 20 and the eye tracking module 30 are stand-alone devices. The memory unit 26 may store foveation adjustment programs and foveation rendering programs. The processor 36 in the eye tracking module 30 may be an ASIC configured to perform eye-tracking according to the eye images received from the image-capturing device 32 for acquiring gaze data and eye movement status data based on the eye images. The eye tracking module 30 may then send the gaze data and eye movement status data to the computing module 20. The control unit 28 is configured to coordinate the operation of each device in the computing module 20 in response to the application request from the user, as well as adjust rendering parameters. The control unit 28 may be implemented as an ASIC with computational ability, software installed in the GPU 24, or hardware disposed in the GPU 24. However, the implementation of the control unit 28 does not limit the scope of the present invention.

In the eye-tracking system 100 or 200, the CPU 22 is also configured to control the operation of the GPU 24 by issuing one or more graphics processing commands/instructions according to the gaze data and the eye movement status data. The CPU 22 may execute one or more foveation rendering programs stored in the memory unit 26, thereby instructing the GPU 24 to render graphical data to be presented on the display 10. The CPU 22 may execute one or more foveation adjustment programs stored in the memory unit 26, thereby instructing the control unit 28 to adjust the rendering parameters. The memory unit 26 may further store data associated with the operational status of the eye-tracking system 100 or 200, such as latency information, rendering parameters corresponding to different latencies, and the currently adopted rendering parameters.

Figure 3:
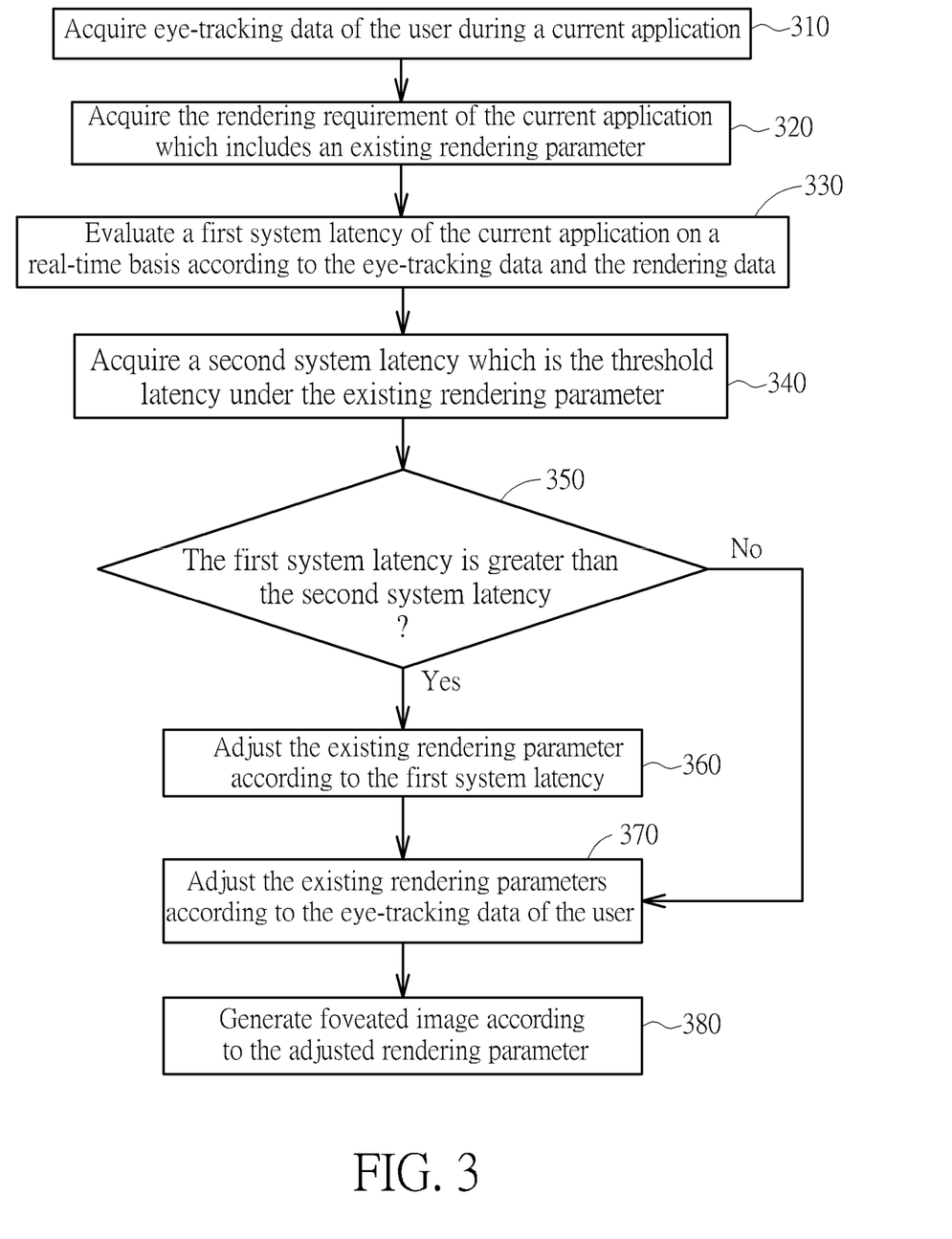
FIG. 3 is a flowchart illustrating a graphics processing method capable of providing adaptive foveated rendering according to an embodiment of the present invention.

FIG. 3 is a flowchart illustrating a graphics processing method capable of providing adaptive foveated rendering according to an embodiment of the present invention. The graphics processing method includes the following steps which may be executed by the eye-tracking system 100 or 200.

Step 310: acquire eye-tracking data of the user during a current application.

Step 320: acquire the rendering requirement of the current application which includes an existing rendering parameter.

Step 330: evaluate a first system latency of the current application on a real-time basis according to the eye-tracking data and the rendering data.

Step 340: acquire a second system latency which is the threshold latency under the existing rendering parameter.

Step 350: determine whether the first system latency is greater than the second system latency; if yes, execute step 360; if no, execute step 370.

Step 360: adjust the existing rendering parameter according to the first system latency; execute step 370.

Step 370: adjust the existing rendering parameter according to the eye-tracking data of the user; execute step 380.

Step 380: generate foveated images according to the adjusted rendering parameters.

In step 310, the eye-tracking data includes the gaze data and the eye movement status data, which may be provided by the CPU 22 of the computing module 20 in the eye-tracking system 100 or by the processor 36 of the eye-tracking module 20 in the eye-tracking system 200 based on the eye images acquired by the image-capturing device 32. The gaze data include gaze locations of the user recorded during the current application. The eye movement status data includes, but not limited to, timing information during the eye-tracking operation, confidence interval regarding the current and/or future gaze position, or state parameters regarding the user's gaze. Example state parameters may include, but are not limited to, blink metrics, saccade metrics, depth of field response, gaze stability, and other types of eye movement.

In the eye-tracking system. 100 wherein the eye tracking module 30 is integrated into the computing module 20, the eye-tracking data may be acquired by the CPU 22 of the computing module 20 based on the eye images acquired by the image-capturing device 32 in step 310. In the eye-tracking system 200 wherein the computing module 20 and the eye tracking module 30 are stand-alone devices, the eye-tracking data may be acquired by the processor 36 of the eye-tracking module 30 based on the eye images acquired by the image-capturing device 32, and then sent to the CPU 22 in step 310.

In step 320, the CPU 22 is configured to acquire the rendering requirement of the current application. The rendering requirement may include, but not limited, gaze-contingent rendering parameters, image size, image processing method, image complexity and historical processing time. In an embodiment, the rendering parameters of the current application may be directly acquired from the rendering requirement. In another embodiment, the rendering parameters of the current application may be calculated based on the latency data stored in the memory unit 26.

The system latency of the eye-tracking system 100 or 200 corresponds to the interval measured from the time when an image is captured by the image-capturing device 32 to when a foveated image generated according to the gaze data is presented on the display 10. The delay includes half of the image exposure time (mid exposure) plus image read-out and transfer time, processing time and time to transfer the data sample to a client computer.

A foveated system is very sensitive to latency. Several parameters that can influence the latency requirements of the foveated system include the size of the full resolution foveal image that follows the gaze, the degree of degradation applied to the image, and the type of degradation method used. Since increased latency has the potential to increase the visibility of foveation artifacts, any lag between large eye movements (saccades) and display updates can limit the extent of foveation and corresponding performance gain. Therefore, the present method address this issue with an adaptive foveated rendering technique depicted in steps 330-370, wherein the foveated rendering range and blur intensity may be adjusted according to the current application and the current system latency for reducing rendering complexity while maintaining the highest possible resolution for the user.

In step 330, the CPU 22 is configured to perform real-time evaluation for acquiring the first system latency. In an embodiment, the first system latency may be acquired based on the rendering requirement of the current application (such as image size, image processing method, image complexity and historical processing time) and the state parameters of the eye-tracking data. In another embodiment, the computing module 20 may further includes a timer (not shown in FIGS. 1 and 2) configured to measure the length of the interval from the time when an image is captured by the image-capturing device 32 to when a foveated image generated according to the gaze data is presented on the display 10. In such embodiment, both the actual latency and the evaluated latency may further be fed into a machine learning method to facilitate the accuracy of the evaluation.

In step 340, the CPU 22 is configured to acquire the second system latency which is the threshold latency under the existing rendering parameter from the memory unit 26. In step 350, the CPU 22 is configured to determine the method of adjusting the rendering parameters.

After acquiring the first system latency associated with the current application and the second system latency associated with the existing rendering parameter, the CPU 22 is configured to determine whether the first system latency is greater than the second system latency in step 350. If the first system latency is not greater than the second system latency, it indicates that adopting the existing rendering parameter under the first system latency does not result in downgrading the balance of resolution quality and rendering performance. Under such circumstance, the CPU 22 is configured to instruct the control unit 28 to adjust the existing rendering parameter according to the eye-tracking data of the user during the current application in step 370.

If the first system latency is greater than the second system latency, it indicates that under the first system latency, the existing render parameter needs to be addressed in order to maintain the balance of resolution quality and rendering performance. Under such circumstance, the CPU 22 is configured to instruct the control unit 28 to adjust the existing rendering parameter according to the first system latency during the current application in step 360 and then according to the eye-tracking data of the user during the current application in step 370.

Figure 4:
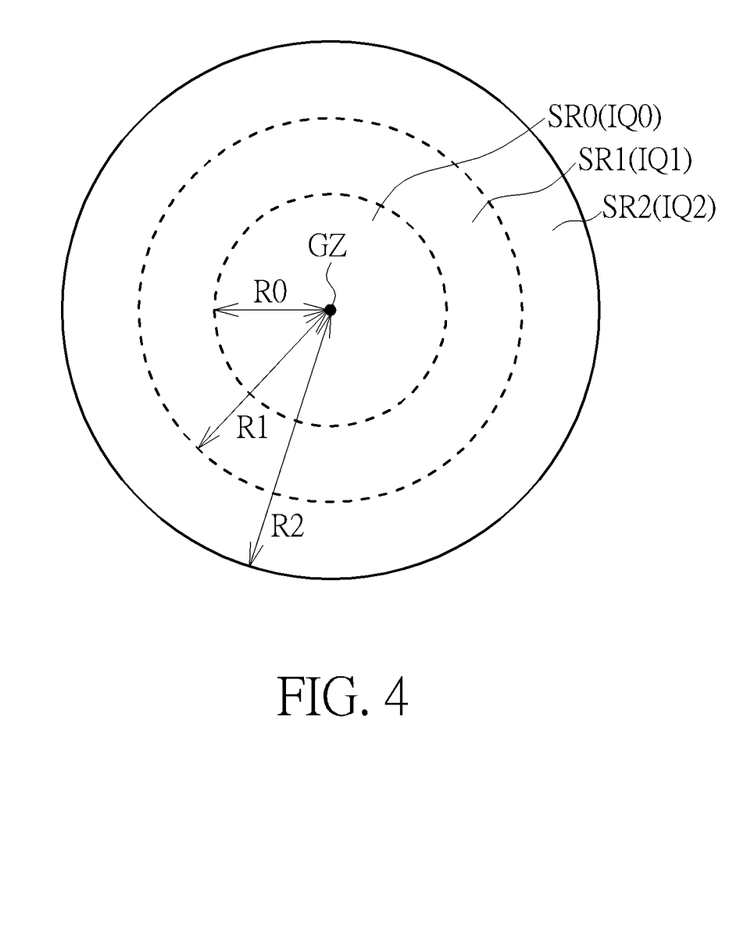
FIG. 4 is a diagram illustrating a foveation rendering technique according to an embodiment of the present invention.

FIG. 4 is a diagram illustrating a foveation rendering technique according to an embodiment of the present invention. In FIG. 4, the quality of an image may decrease in a stepped manner from the center of a gaze area outward. The sample region SR0 is the foveal region around the central gaze point GZ and is rendered with high resolution. The sample regions SR1-SRN are peripheral regions outside the foveal region around the central gaze point GZ and are rendered with lower resolution, wherein N is a positive integer. The image resolutions of the sample regions SR0-SRN are represented by IQ0-IQN, wherein IQ0>IQ1> . . . >IQN. The distances between the outer boundaries of the sample regions SR0-SRN and the central gaze point GZ are respectively represented by R0-RN, wherein R0<R1< . . . <RN. For illustrative purpose, FIG. 4 depicts the embodiment of N=2 and the outer boundary of each sample region is a concentric circle. However, the number and the shape of the sample regions SR0-SRN do not limit the scope of the present invention.

In an embodiment, a Gaussian filter may be used to adjust the image quality of each sample region by blurring images and removing details using 2D Gaussian function having an impulse response given by the following equation (1), wherein x and y represent the coordinates of pixel and σ represents the standard deviation.

$$G(x, y) = \frac{1}{2\pi\sigma^2} \times \exp\left(-\frac{x^2 + y^2}{2\sigma^2}\right) \tag{1}$$

Filtering is usually applied to an image through convolution. The convolution kernel is a window which is slid over the image pixel by pixel and replaces the middle pixel in the window by some kind of transformation which describes the filter. The kernel coefficients diminish with increasing distance from the kernel's center (the gaze point GZ), wherein central pixels have a higher weighting than those on the periphery. Gaussian kernel coefficients depend on the value of σ, and larger values of σ produce a wider peak (greater blurring). Since kernel size increases with increasing σ to maintain the Gaussian nature of the filter, a larger ranger can be blurred by setting a higher σ value.

Figure 5:
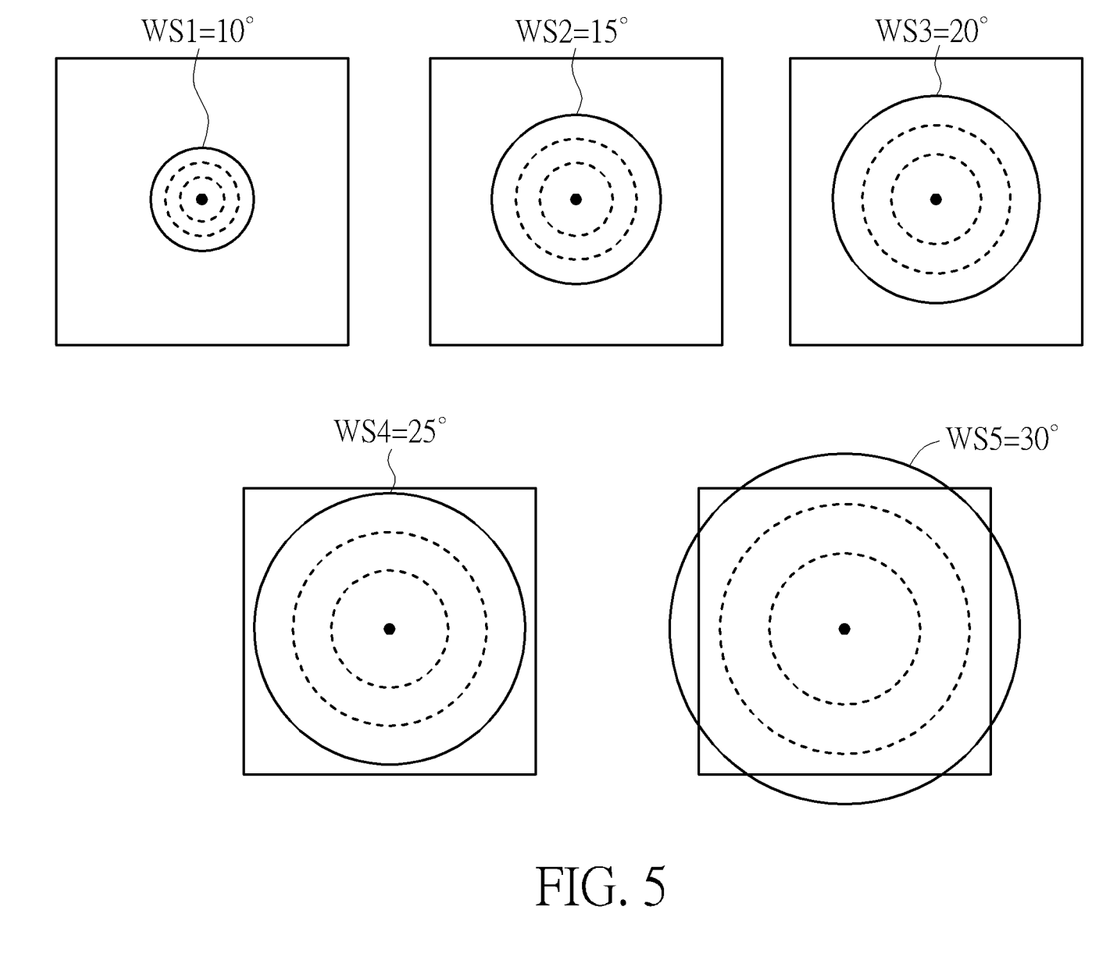
FIG. 5 is a diagram illustrating a method of adjusting rendering parameters according an embodiment of the present invention.

FIG. 5 is a diagram illustrating a method of adjusting rendering parameters according an embodiment of the present invention. The window sizes of the convolution kernels are designated by WS1-WSM, wherein M is a positive integer. For illustrative purpose, FIG. 5 depicts the embodiment of M=5, and it is assumed that the window size WS1-WS5 are associated with 10 degree, 15 degree, 20 degree, 25 degree and 30 degree viewing angle of the user, respectively.

Figure 6:
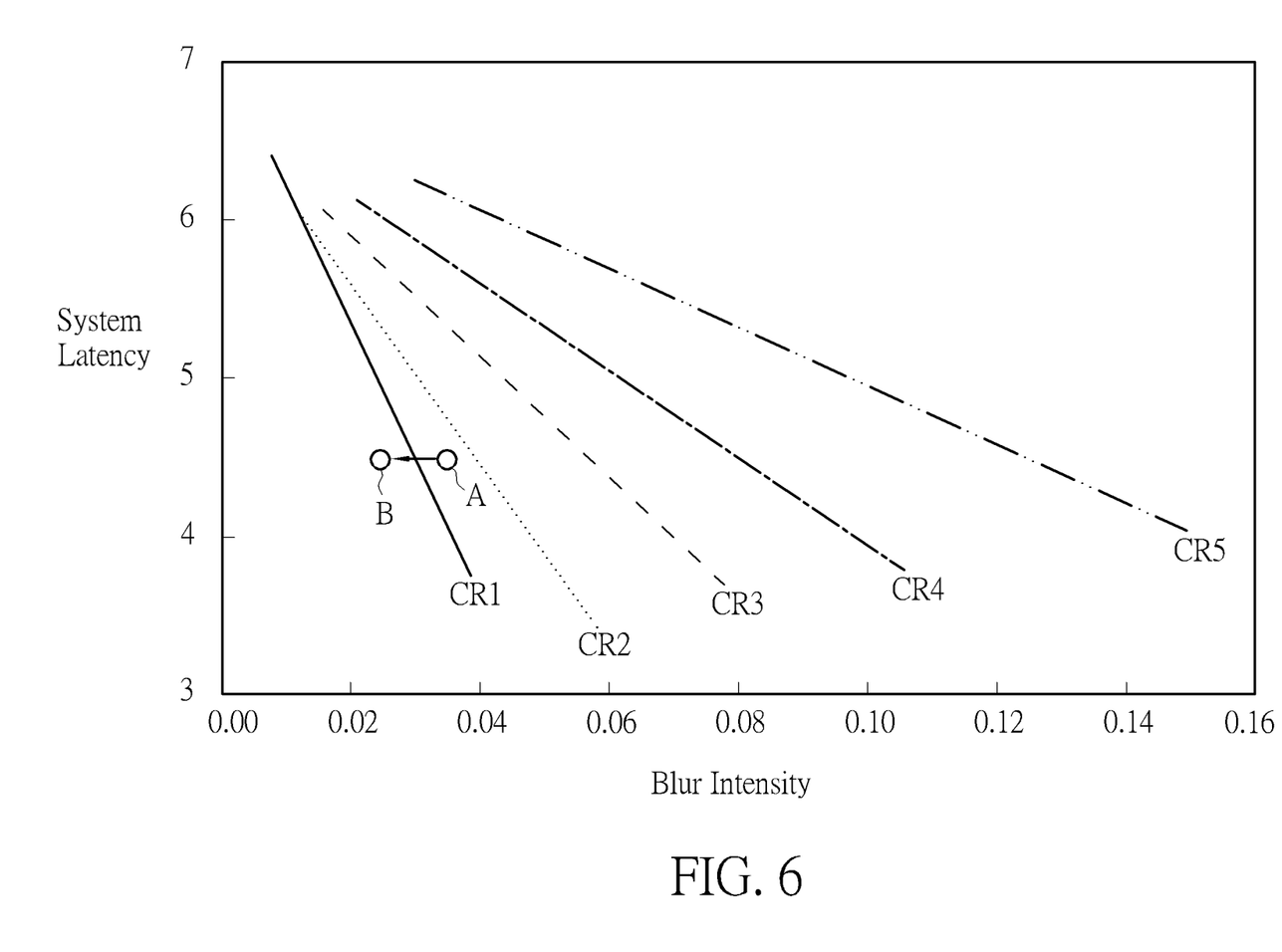
FIG. 6 is a diagram illustrating the amount of foveation that users can tolerate in conjunction with various levels of eye-tracking latency, fovea size, and foveation technique.

FIG. 6 is a diagram illustrating the amount of foveation that users can tolerate in conjunction with various levels of eye-tracking system latency, fovea size, and foveation technique. The vertical axis represents the value of system latency, and the horizontal axis represents blur intensity. Curves CR1-CR5 correspond to different window sizes of the filter. For a given curve associated with fovea size, if a specific system latency is larger than a given latency on the curve specified by the existing rendering parameter (i. e. fovea size, blur intensity), adopting the window size associated with the given curve may not be able to maintain the balance of resolution quality and rendering performance, and the specific system latency is thus deemed not permitted by the existing rendering parameters associated with the given curve.

For illustrative purpose, it is assumed that the window size WS1 associated with 10 degree viewing angle represented by Curve CR1 is acquired in step 320. If it is determined in step 350 that the first system latency is greater than the second system latency which is acquired from the curve CR1 by further specifying the rendering parameter (i.e. blur intensity), the existing rendering condition is not permitted by the rendering parameter associated with the curve CR1 and may result in a blur intensity which fails to preserve the high fidelity for the user (as indicated by a dot A) in FIG. 6.

In an embodiment when executing step 360, the CPU 22 may to instruct the control unit 28 to adjust the rendering parameters by decreasing the blur intensity while maintain the same window size WS1. Under such circumstance, the adjusted rendering condition now results in a blur intensity which is permitted by the rendering parameters associated with Curve 1, as indicated by a dot B in FIG. 6.

In another embodiment when executing step 360, the CPU 22 may to instruct the control unit 28 to adjust the current rendering parameters by increasing the window size of the filter, such as by adopting the rendering parameters associated with Curve 2. Under such circumstance, the adjusted rendering condition now results in a blur intensity (indicated by a dot A) which is permitted by the rendering parameters associated with Curve 2.

In yet another embodiment when executing step 360, the CPU 22 may to instruct the control unit 28 to adjust the existing rendering parameters by simultaneously decreasing the blur intensity (such as to the blur intensity indicated by the dot B) and increasing the window size of the filter (such as adopting the rendering parameters associated with Curve 2). Under such circumstance, the adjusted rendering condition now results in a blur intensity (indicated by a dot B) which is permitted by the rendering parameters associated with Curve 2.

In the embodiment depicted in FIG. 3, the determination step 350 and the adjustment step 360, when required, are executed prior to the adjustment step 370. In another embodiment, step 370 may be executed first for adjusting the existing rendering parameter according to the eye-tracking data of the user first before executing the determination step 350.

Once the adjustment at step 370 has taken place, foveated images may be generated according to the adjusted rendering parameters in step 380, by, for example, using the method described with respect to FIGS. 4 and 5. The foveated image data may then be provided on the display 10.

In conclusion the present invention provides a graphics processing method and an eye-tracking system capable of providing adaptive foveated rendering. If the system latency of a current application is greater than the threshold system latency under the existing rendering parameter, adjusted rendering parameters are provided by adjusting the existing rendering parameters according to the first system latency. Foveated images may thus be generated according to the adjusted rendering parameters in order to maintain the balance of resolution quality and rendering performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A graphics processing method, comprising:
acquiring eye-tracking data of a user;
acquiring a rendering requirement of a current application which includes an existing rendering parameter associated with the current application;
evaluating a first system latency of the current application on a real-time basis according to the eye-tracking data and the rendering requirement;
determining whether the first system latency is greater than a second system latency which is a threshold latency under the existing rendering parameter;
adjusting the existing rendering parameter according to the first system latency when determining that the first system latency is greater than the second system latency; and
generating a foveated image according to the adjusted rendering parameter during the current application.

2. The graphics processing method of claim 1, further comprising:
adjusting the existing rendering parameter according to the eye-tracking data of the user.

3. The graphics processing method of claim 1, wherein the eye-tracking data includes:
gaze data which includes gaze locations of the user recorded during the current application; and
eye movement status data which includes timing information during the current application, a confidence interval regarding a future gaze position, a gaze status of the user, a blink metric of the user, and/or a saccade metric of the user.

4. The graphics processing method of claim 1, wherein the rendering requirement includes an image size, an image processing method, an image complexity and a historical processing time associated with the current application.

5. The graphics processing method of claim 1, wherein generating the foveated image is performed by:
rendering a foveal region around a central gaze point of an image with a first resolution; and
rendering a peripheral region outside the foveal region of the image with a second resolution lower than the first region.

6. The graphics processing method of claim 5, wherein adjusting the existing rendering parameter according to the first system latency is performed by:
adjusting a size of the foveal region according to the first system latency; or
adjusting a difference between the first resolution and the second resolution according to the first system latency.

7. The graphics processing method of claim 5, further comprising:
adjusting a first rendering parameter associated with the current application by adjusting a size of the foveal region according to the first system latency; and
adjusting a second current rendering parameter associated with the current application by adjusting a difference between the first resolution and the second resolution according to the first system latency.

8. A non-transitory computer-readable medium having computer-readable instructions embodied therein, the computer-readable instructions being configured to implement a graphics processing method when executed, the graphics processing method comprising:
acquiring eye-tracking data of a user;
acquiring a rendering requirement of a current application which includes an existing rendering parameter associated with the current application;
evaluating a first system latency of the current application on a real-time basis according to the eye-tracking data and the rendering requirement;
determining whether the first system latency is greater than a second system latency which is a threshold latency under the existing rendering parameter;
adjusting the existing rendering parameter according to the first system latency when determining that the first system latency is greater than the second system latency; and
generating a foveated image according to the adjusted rendering parameter during the current application.

9. An eye-tracking system which provides an adaptive foveated rendering, comprising:
an eye tracking module comprising an image-capturing device configured to capture eye images of a user;
a computing module, comprising:
a graphic processing unit configured to accelerate rendering of graphical data;
a control unit configured to coordinate an operation of each device in the computing module in response to an application request from the user and adjust rendering parameters; and
a central processing unit, configured to:
acquire a rendering requirement of a current application which includes an existing rendering parameter associated with the current application;
evaluate a first system latency of the current application on a real-time basis according to eye-tracking data and the rendering requirement;
determine whether the first system latency is greater than a second system latency which is a threshold latency under the existing rendering parameter;
instruct the control unit to adjust the existing rendering parameter according to the first system latency when determining that the first system latency is greater than the second system latency; and
instruct the GPU to generate a foveated image according to the adjusted rendering parameter during the current application; and
a display configured to display the foveated image.

10. The eye-tracking system of claim 9, wherein:
the eye tracking module is integrated into the computing module; and
the CPU is further configured to acquire the eye-tracking data based on the eye images acquired by the image-capturing device.

11. The eye-tracking system of claim 9, wherein:
the eye tracking module and the computing module are stand-alone devices; and
the eye tracking module further comprises a processor configured to acquire the eye-tracking data based on the eye images acquired by the image-capturing device.

* * * * *